Feb. 9, 1971  J. L. DURAND  3,561,834
STEPPING MOTOR HAVING HYPOCYCLICALLY REVOLVING ROTOR
Filed March 19, 1969  4 Sheets-Sheet 1

INVENTOR.
JOSEPH L. DURAND
BY *Roy m Pitts*
ATTORNEY

*INVENTOR.*
JOSEPH L. DURAND

BY

ATTORNEY

Feb. 9, 1971  J. L. DURAND  3,561,834
STEPPING MOTOR HAVING HYPOCYCLICALLY REVOLVING ROTOR
Filed March 19, 1969  4 Sheets-Sheet 3

INVENTOR.
JOSEPH L. DURAND
BY
Roy M Pitts
ATTORNEY

United States Patent Office 3,561,834
Patented Feb. 9, 1971

3,561,834
STEPPING MOTOR HAVING HYPOCYCLICALLY REVOLVING ROTOR
Joseph L. Durand, Woodland Hills, Calif., assignor to Systems Technology, Inc.
Filed Mar. 19, 1969, Ser. No. 842,414
(Filed under Rule 47(b) and 35 U.S.C. 118)
Int. Cl. H02k 37/00
U.S. Cl. 310—49
14 Claims

ABSTRACT OF THE DISCLOSURE

A stepper motor having a polyphase stator and a rigid ring-like rotor of magnetic material mounted for hypocyclic rotation relative to the stator. The rotor is circumferentially slotted by means of a number of uniformly axially and circumferentially spaced slots, and adjacent field pieces of the stator are oppositely poled for the generation of an improved sealing pole effect in the rotor, whereby detent action and reduced rotor slip are obtained.

CROSS-REFERENCE TO COPENDING APPLICATION (1) U.S. patent application Ser. No. 707,028 filed Feb. 21, 1968 by J. L. Durand, now U.S. Pat. No. 3,512,019, for Electromagnetic Device.

BACKGROUND OF THE INVENTION

The increased use of electronic data processing equipment such as analog computers and the like has made desirable miniaturization in the design of such equipment to achieve high density circuit packaging. However, the miniaturization of reliable electromechanical computing elements has not proceeded at the same rate as that of the circuit components with which such electromechanical elements are associated.

A stepper motor, of fewer components and simpler design and which lends itself to small yet reliable design configurations, is disclosed in my copending U.S. patent application Ser. No. 707,028 filed Feb. 21, 1968, now U.S. Pat. 3,512,019, for Electromagnetic Device. In the application of such device as an open-loop stepper motor with motion reduction features, it is often preferable that the device operate synchronously with the polyphase excitation of the polyphase stator. Accordingly, means is desired to provide detent action and reduced slip in such small yet reliable design configurations for stepper motors.

SUMMARY OF THE INVENTION

By means of the concept of the invention, a slotted rotor is employed in cooperation with opposite poling of adjacent field pieces, in a stepper motor, to achieve a sealing pole effect in the rotor, resulting in detent action and reduced slip.

In a preferred embodiment of the invention, there is provided a stepper motor having a polyphase stator and a rigid ring-like rotor of magnetic material mounted for hypocyclic rotation relative to the stator. The rotor is circumferentially slotted by means of a number of uniformly axially and circumferentially spaced slots, and adjacent field pieces of the stator are oppositely poled.

In normal operation of the above described arrangement, the slotted rotor cooperates with the oppositely-poled adjacent field pieces to provide the sealing pole effect. Accordingly, it is an object of the invention to provide an improved stepper motor.

It is another object of the invention to provide electromotive means having enhanced utility as an open-loop stepper motor.

Another object is to provide an open-loop stepper motor demonstrating improved detent action and reduced slip.

These and other objects of the invention will become apparent from the following description, taken together with the accompanying drawings in which:

BRIEF DESCRIPTION OF THE DRAWINGS

In the drawings, like reference characters refer to like parts.

DESCRIPTION OF THE PREFERRED EMBODIMENTS

Figure 1:
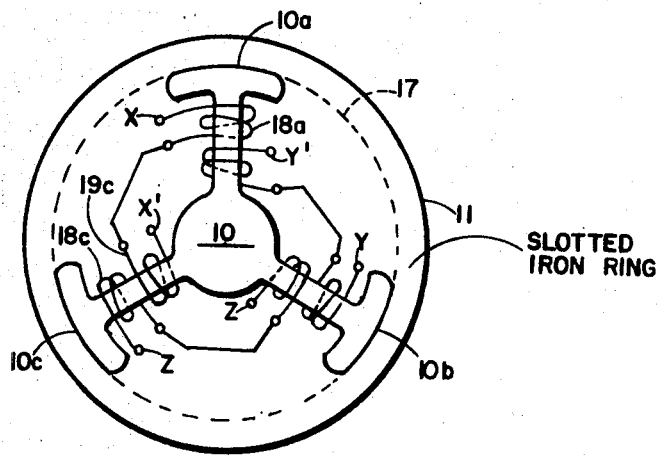
FIG. 1 is a schematic arrangement of one aspect of the inventive concept and illustrating a bifilar winding.

Referring to FIG. 1 there is illustrated a schematic arrangement of one aspect of the inventive concept, utilizing a bifilar winding. There is provided a stator 10 having a plurality of no fewer than three like electromagnetic field pieces or pole pieces 10a, 10b and 10c, equi-angularly spaced, the outer radial ends of which describe the locus 17 of an inner circle or boss. Each of field pieces 10a, 10b and 10c includes two split or component windings, a like first split winding of each field piece being connected in series circuit with an oppositely poled relative to a second winding of an adjacent field piece, such interconnected first and second windings forming a bifilar winding. For example, each of first winding 18a on field piece 10a and second winding 19c on field piece 10c have a commonly connected terminal, interconnecting windings 18a and 19c in series and oppositely poled, as a bifilar winding, the remaining second terminals of windings 18a and 19c forming a respective one of terminals X–X¹ of such bifilar winding. In like manner, two more bifilar stator windings are formed in FIG. 1 having a respective pair of terminals Y–Y¹ and Z–Z¹.

There is also provided in FIG. 1 a ring-like rotor of magnetic material having a radius differing from that of the locus 17 and rotatably mounted for hypocyclic motion about locus 17 in response to sequential field pieces 10a, 10b and 10c. Rotor 11 is circumferentially slotted by means of a number of uniformly circumferentially spaced slots, as shown more particularly in FIG. 2, the number of slots preferably being different from the number of field pieces.

Figure 2:
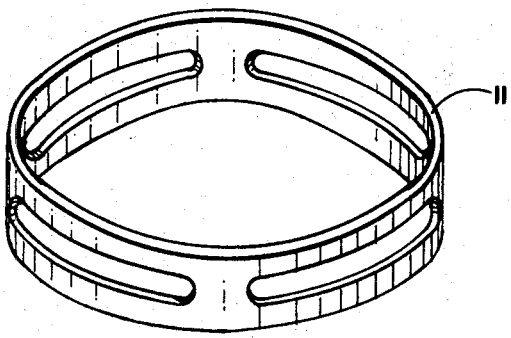
FIG. 2 is a view in perspective of an exemplary circumferentially slotted rotor employed in the arrangement of FIG. 1.

In normal operation of the arrangement described by FIGS. 1 and 2, a polyphase power source or the like may be utilized to excite stator 10, attracting rotor 11 to successive ones of the effective poles of stator 10, resulting in hypocyclic motion of rotor 11, as explained in my above-mentioned copending U.S. patent application Ser. No. 707,028, but with the following difference.

Figure 3A:
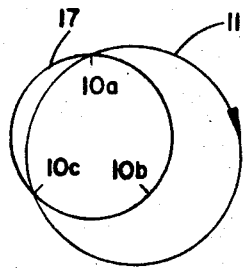
FIGS. 3a, 3b, 3c and 3d are illustrations of the hypocyclic motion of the rotor of FIG. 1, resulting from polyphase excitation of the stator.
Figure 3B:
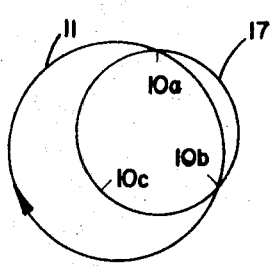
Figure 3C:
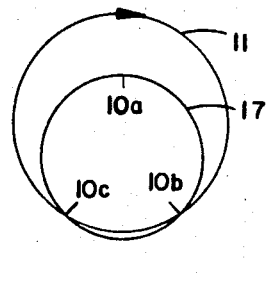
Figure 3D:
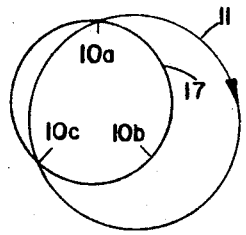

The effective pole occurring, upon excitation of a given bifilar winding, is comprised of two oppositely poled adjacent pole faces of stator 10. For example, upon the application of an excitation potential across terminals X—X of the bifilar winding comprised of coils 18a and 19c, field pieces 10a and 10c are magnetized concomitantly and of opposite polarity. Rotor ring 11 is thus attracted to and maintained across field pieces 10a and 10c, and acts as a magnetic keeper across such two adjacent and oppositely-poled field pieces. Thus, the effective stator pole, for purposes of describing the incremental hypercyclic rotor motion, or stepper motor action, is intermediate the positions of stator field pieces 10a and 10b, as shown in FIG. 3a. The effect of successive phases of polyphase excitation is shown in FIGS. 3b, 3c and 3d.

The advantage of the two-point contact provided rotor 11, by the keeper action or sealing thereof, is increased detent action and reduced rotor slippage. In this way, the gain of the motor integrating action is maintained more nearly constant and the device may be more successfully employed in open-loop instrument applications in which such gain stability may be particularly critical.

The effect of the slotting of the rotor is to enhance the sealing pole effect. By providing an increased flux density path, a ring of given radial thickness provides an increased radial orientation of the magnetic flux at the points of contact between rotor 11 and stator 10, thereby enhancing the sealing pole effect. However, the maximum amount of rotor magnetic material removed by thus slotting the rotor should preferably be limited to or not exceed one-third of the (unslotted) rotor.

Figure 5:
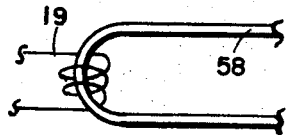
FIG. 5 illustrates one of the pole pairs of the sealing poles employed in the arrangement of FIG. 4.
Figure 4:
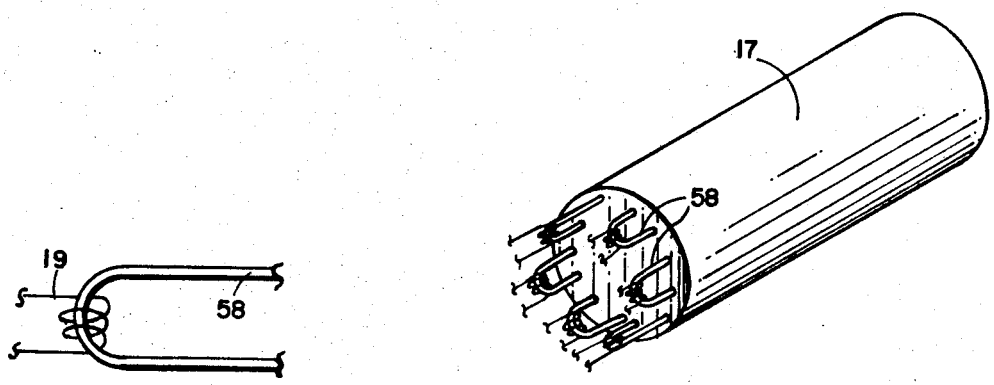
FIG. 4 is a view in perspective of an alternate arrangement for a motor stator providing sealing poles of opposite polarity.

Although such sealing pole effect has been described in terms of utilizing a bifilar winding, the concept of the invention is not so limited, such effect being alternatively achievable by a monofilar winding as shown more particularly in FIGS. 4 and 5.

Referring to FIG. 4, there is illustrated in perspective view a stator assembly comprising a cylindrical non-magnetic boss 17 having an even-number of regularly-spaced, longitudinally extending apertures into adjacent ones of mutually exclusive pairs of which are inserted opposite ends of a U-shaped magnetic core 58, having a singular winding 19 at the bottom thereof, as shown more particularly in FIG. 5.

It may be demonstrated that less external force is required to induce hypocyclic motion of one body relative to another than for pure rotational motion thereof. Further, because of the pendulosity of the rotor (of the hypocyclic device of FIGS. 3a, 3b, 3c and 3d), such device may, in a practical application, tend to be sensitive or subject to hypocyclic action or motoring due to lateral vibrational acceleration or exposure to a vibration environment. Sensitivity to such vibration may be reduced by means of a specially detented spring arrangement, as shown in FIGS. 6 and 7.

Figure 6:
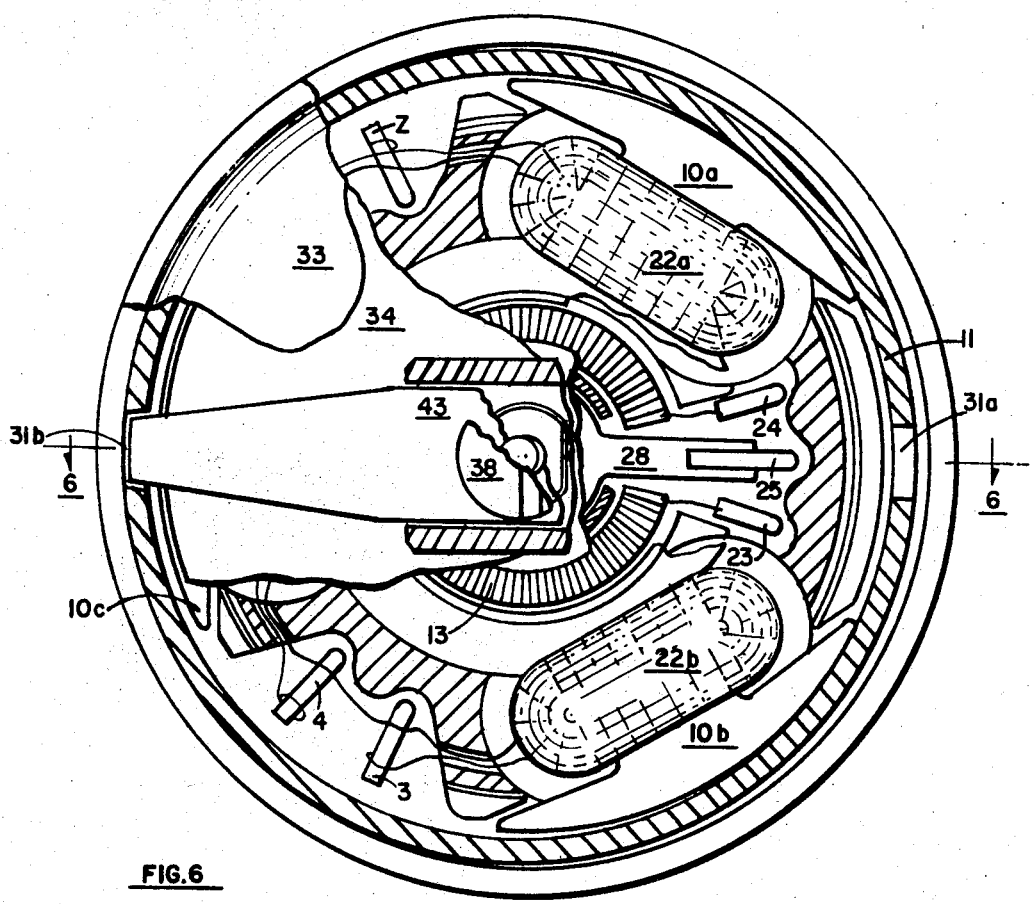
FIGS. 6 and 7 are respective top and side views, partially torn away and partially in section, illustrating in detail one embodiment of the general arrangement of FIGS. 1 and 2.
Figure 7:
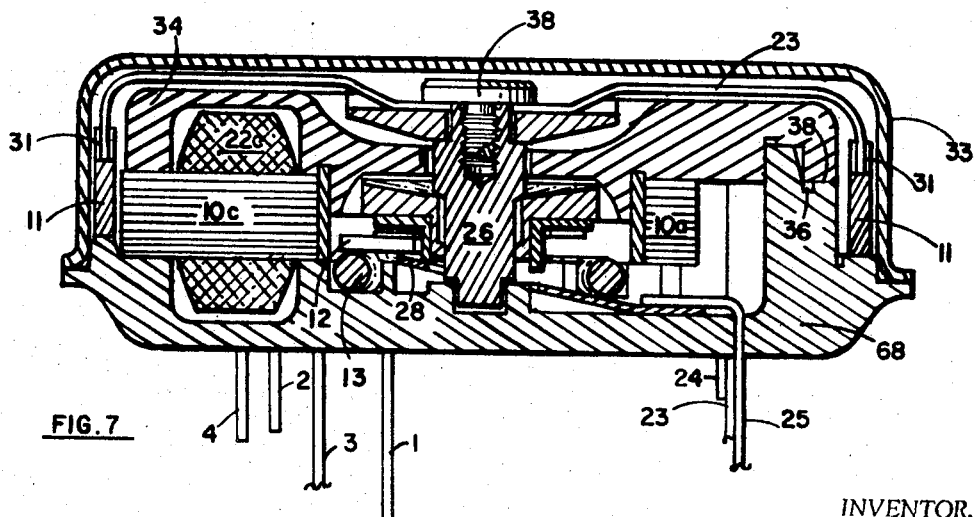

Referring to FIG. 6, there is illustrated a partially torn away and partially in section, of a "pancake" design configuration embodying the principles of FIGS. 1 and 2, and comprising field pieces 10a, 10b and 10c which are comprised of vertically stacked laminations (shown more clearly in the central vertical section of FIG. 7) and mounted in a molded plastic base 68 (shown more particularly in FIG. 7). Each of field pieces 10a, 10b and 10c mounts a winding or motor coil 22a, 22b, and 22c corresponding to the two components or split windings on each field piece in FIG. 1 and similarly connected as the bifilar windings of FIG. 6. Such polyphase bifilar windings, as shown in FIG. 6, are connected internally of the motor in a star-configuration, pin 1 of the motor assembly being a common electrode (corresponding to a common interconnection of terminals $X^1$, $Y^1$ and $Z^1$ in FIG. 1), and pins 2, 3 and 4 in FIGS. 6 and 7 corresponding to respective ones of terminals X, Y and Z in FIG. 1.

A molded plastic cover 34 has a lip 35 resting on a shoulder 36 of base 68 to assist in securing the field pieces. Rotatably mounted externally of field pieces 10a, 10b, 10c and cover 34 is a rotor ring 11 of magnetic material and corresponding to that illustrated in FIG. 2 and completing the motor element.

There is further provided in the arrangement of FIGS. 6 and 7 a potentiometer assembly comprising a toroidal wire-wound resistive element 13 secured to base 68 and a wiper element 12 in electrical contact with element 13. The two terminals of resistive element 13 are electrically connected to respective ones of pins or electrodes 23 and 24, while wiper 12 is electrically connected to pin 25 by the cooperation of a metallic element 28, one end of which is mechanically and electrically coupled to pin 25 and the other end of which bears against the wiper assembly. The wiper assembly of the potentiometer is mechanically coupled to rotor 11 by means of a potentiometer drive shaft 26, rotatably mounted relative to motor base 68, and a coupler 23 of, say, beryllium copper, which extends diametrically across rotor 11, the ends of coupler 23 fitting down into notches or recesses 31a and 31b in an upper edge of rotor 11. A center-area coupler 23 is recessed and is mechanically fastened or secured to drive shaft 26 by a screw 38. The motor assembly is covered over by a press-fit or snap-on cover 33, which is press-fit onto base 68.

In normal operation of the arrangement of FIGS. 6 and 7, the motoring or rotation of rotor 11 about the longitudinal axis of drive shaft 26 in response to an applied excitation of the stator windings, is mechanically coupled to wiper 12 by means coupler 23, screw 38, and shaft 26, while the radial motion of rotor 11 (due to the hypocyclic nature of the motoring thereof) is accommodated by the flexural or spring-like properties of coupler 23.

Figure 8A:
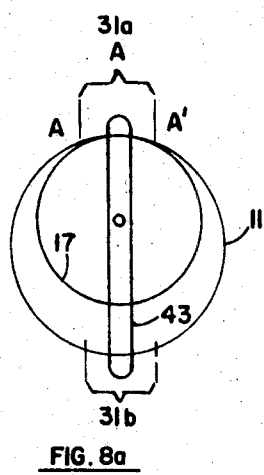
FIGS. 8a and 8b are diagrams of an aspect of the motoring action of the embodiment of FIGS. 6 and 7.
Figure 8B:
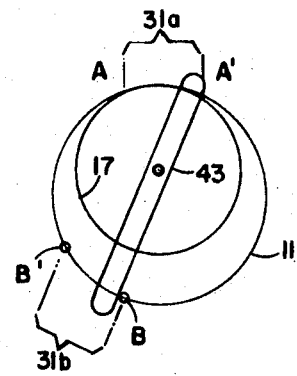

Another performance feature provided by the cooperation of coupler 23 with rotor 11 in FIGS. 6 and 7 is the reduction of the sensitivity or responsiveness of potentiometer wiper 13 to lateral vibrations or accelerations sensed by rotor 11. By making the peripheral dimension or angular extent of the notches or recesses 31a and 31b (in rotor 11), into which the ends of coupler 23 are inserted, larger than the corresponding dimensoin for the ends of coupler 23 by an amount corresponding to a single step of the stepper motor action, the sensitivity of the pickoff to a vibrational environment is reduced without substantially effecting the stepper resolution. Such effect may be appreciated from a consideration of FIGS. 8a and 8b which schematically illustrate the geometry of such effect. In FIG. 8a, coupler 23 is shown lying between the stops A-$A^1$ and B-$B^1$ of the recesses or notches 31a and 31b in diametrically opposed portions of rotor 11. Upon initial motoring action of rotor 11, rotor 11 rotates clockwise about the virtual stator pole between A-$A^1$. Now, the rotational travel of notch 31b (diametrically opposite region A-$A^1$) is greater than that of A-$A^1$ (notch 31a). Therefore, the backlash or mechanical play between coupler 23 and rotor 11 is taken up by notch 31b at point B in response to such motion, as shown in exaggerated form in FIG. 7b. The striking of coupler 23 by point B of notch 31b (in rotor 11) tends to rotate coupler 23 clockwise about the center thereof, thus forcing an opposite extremity of coupler 23 into engagement with stop $A^1$ of notch 31a, as shown in FIG. 7b. Now, because coupler 23 is engaged in either extremity on a common edge thereof, the stepper motor action may be reversed without loss of accuracy. For like reason, no couple will be produced in response to a sensed vibration. In other words, the response to vibration is minimized without affecting the motoring action of the device.

Accordingly, an improved stepper motor has been described, having improved detent action and reduced response to vibration.

In the application of a stepper motor as an integrator or memory device, it is necessary to include a rotor position pickoff for indicating the angular position (relative to the motor case) and also means for restraining the pickoff or rotor against spurious rotary movement during the unexcited state of the motor, so as to retain or accurately "remember" the latest excited rotor position.

The movement restraining means may include axial spring loading of the wiper or movable element of the pickoff, while the overcoming of such restraint may involve at least one of two techniques: the generation of sufficient electromotive force or motoring torque by the motor, itself, to overcome such restraint; or the use of ancillary activation means for such function. In either event, the additional actuation requirement militates against the degree of miniaturization sought and, in the case of the ancillary actuation means, also reduces the reliability achieved because of the additional design complexity involved.

Figure 9:
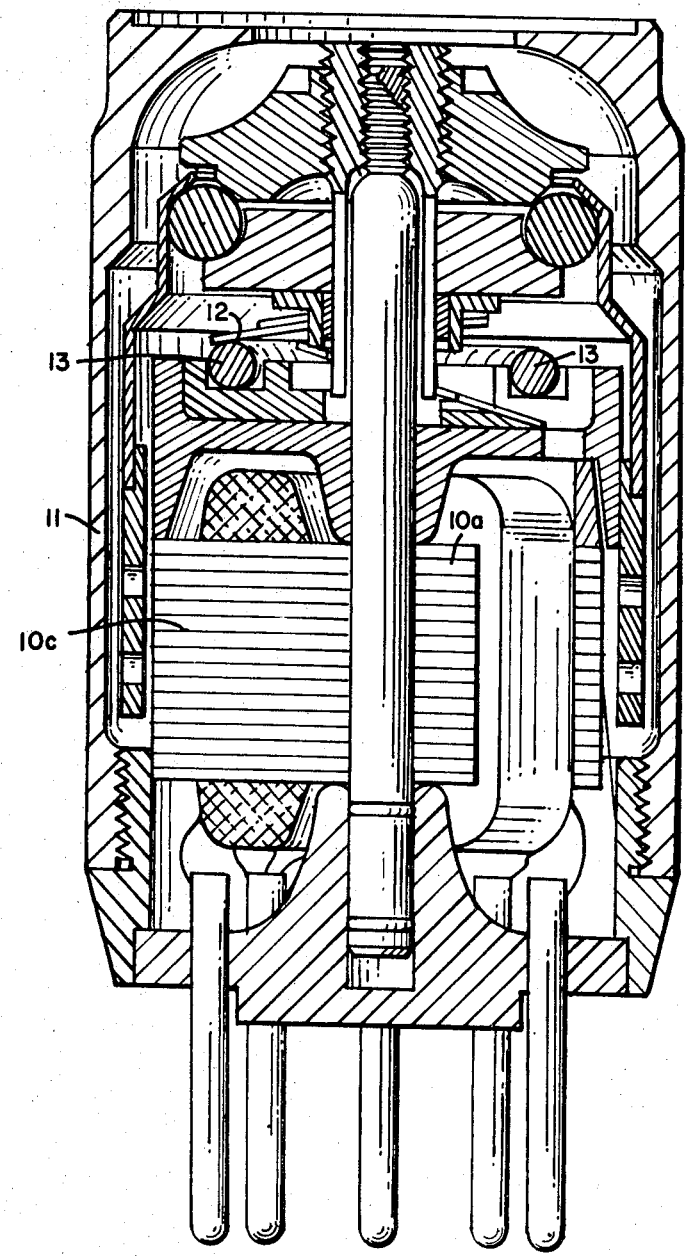
FIG. 9 is an illustration partially in vertical section and partially torn away of an alternate embodiment of the general arrangements of FIGS. 1 and 2.

In a preferred embodiment of an additional aspect of the invention, as shown more particularly in FIG. 9, there is provided an electromechanical integrator comprising a stepper motor of the class described above, and an axially spring loaded, frictionally restrained rotor position pickoff potentiometer comprising resistive and wiper elements 12 and 13. The stator 10a, 10b and 10c is axially tapered to provide a tapered boss for the hypocyclic motion of the rotor 11, the direction of the taper being the same as that of the spring preload which serves to frictionally restrain rotation of the rotor position pickoff.

In normal operation of the arrangement of FIG. 9, upon initial polyphase excitation of the stator, motoring of the rotor or rotor hypocyclic motion about the tapered boss, results in the rotor "walking down" the boss in an axial direction opposite the small dimension of the tapered boss, and tending to oppose the pickoff preload. In other words, an axial de-braking component force is generated, in addition to the tangential force component associated with the motoring torque, thereby reducing the frictional restraint which the motoring torque must overcome in the manner of a back-off clutch. Such full frictional restraint is, of course, present during the unactuated motor state to allow the rotor pickoff to function as a memory element.

Thus, a simplified electromechanical integrator is provided which combines a sealing pole effect for improved detenting action during motoring and clutching means between excitation states of the motor. Such simplified design provides increased performance without sacrificing reliability, and also demonstrates increased susceptibility to miniaturization.

Although the invention has been described and illustrated in detail, it is to be clearly understood that the same is by way of example only, and not by way of limitation, the spirit and scope of the invention being limited only by the terms of the appended claims.

I claim:
1. A stepper motor comprising
   a plurality of no fewer than three radially arranged, uniformly spaced electromagnetic field pieces, radial ends of which field pieces describe the locus of a circle having a geometric center;
   a ring-like rotor of magnetic material having a radius differing from that of said locus and rotatably mounted for hypocyclic motion thereabout in response to a sequential excitation of said electromagnetic field pieces,
   said rotor being circumferentially slotted by means of a number of uniformly axially and circumferentially spaced slots.

2. The device of claim 1 in which each of said field pieces includes a like first and second split winding, a first split winding of each field piece being connected in series circuit with and oppositely poled relative to a second winding of an adjacent field piece, said interconnected first and second windings comprising a bifilar winding.

3. The device of claim 1 in which the number of field pieces comprise an even number, formed by pairs of adjacent field pieces, each pair being formed of a U-shaped magnetic core, having a winding about the bottom of the U-shape.

4. The device of claim 1 in which said rotor is frictionally rotationally restrained by axial preload means and field pieces are axially tapered.

5. In a stepper motor of the type comprising no fewer than three radially arranged electromagnetic field pieces and a rigid ringlike rotor of magnetic material and mounted for hypocyclic motion about the radially arranged field pieces, the improvement of memory means coupled to said rotor, said radially arranged field pieces being axially tapered, whereby said rotor and pickoff cooperate with said field pieces in the manner of a back-off clutch.

6. The device of claim 5 in which said rotor is slotted by means of a number of uniformly axially and circumferentially spaced slots, said number being different from the number of field pieces.

7. The device of claim 6 in which there is provided means for exciting two adjacent field pieces concomitantly and of opposite polarity during a portion of an excitation cycle of said device.

8. The device of claim 6 in which adjacent field pieces include bifilar windings.

9. A stepper motor comprising
   a plurality of no fewer than three radially arranged, uniformly spaced electromagnetic field pieces, radial ends of which field pieces describe the locus of a circle having a geometric center; and
   a ring-like rotor of magnetic material having a radius differing from that of said locus and rotatably mounted for hypocyclic motion thereabout in response to a sequential excitation of said electromagnetic field pieces,
   said rotor being circumferentially slotted by means of a number of uniformly axially and circumferentially spaced slots, said slotted rotor being formed with at least two axially spaced sets of uniformly circumferentially spaced slots.

10. The device of claim 1 in which said slotted rotor is formed with a like number of slots in each slot set, said number being different from the number of said field pieces.

11. A stepper motor comprising
   a plurality of no fewer than three radially arranged, uniformly spaced electromagnetic field pieces, radial ends of which field pieces describe the locus of a circle having a geometric center; and
   a ring-like rotor of magnetic material having a radius differing from that of said locus and rotatably mounted for hypocyclic motion thereabout in response to a sequential excitation of said electromagnetic field pieces,
   said rotor being circumferentially slotted by means of a number of uniformly axially and circumferentially spaced slots, said slotted rotor being formed with a number of slots in said slotted rotor different from the number of said field pieces.

12. A stepper motor comprising
   a plurality of no fewer than three radially arranged, uniformly spaced electromagnetic field pieces, radial ends of which field pieces describe the locus of a circle having a geometric center; and
   a ring-like rotor of magnetic material having a radius differing from that of said locus and rotatably mounted for hypocyclic motion thereabout in response to a sequential excitation of said electromagnetic field pieces, said rotor being circumferentially slotted by means of a number of uniformly axially and circumferentially spaced slots; and
   means for exciting two adjacent field pieces concomitantly and of opposite polarity during a portion of an excitation cycle of said device.

13. The device of claim 1 in which each of said field pieces includes a like first and second split winding, a first split winding of each field piece being connected in series circuit with and oppositely poled relative to a second winding of an adjacent field piece, said interconnected first and second windings comprising a bifilar winding.

14. The device of claim 13 in which the number of field pieces comprise an even number, formed by pairs of adjacent field pieces, each pair being formed by a U-shaped magnetic core, having a winding about the bottom of the U-shape.

References Cited

UNITED STATES PATENTS

| | | | |
|---|---|---|---|
| 2,413,805 | 1/1947 | Vickers | 310—82 |
| 2,703,370 | 3/1955 | Steensen | 310—67 |
| 3,392,293 | 7/1968 | DeBoa | 310—49 |

FOREIGN PATENTS

| | | | |
|---|---|---|---|
| 953,955 | 12/1949 | France | 310—49 |
| 233,460 | 7/1944 | Switzerland | 310—82 |
| 222,046 | 6/1942 | Switzerland | 310—82 |

MILTON O. HIRSHFIELD, Primary Examiner

R. SKUDY, Assistant Examiner

U.S. Cl. X.R.

310—67, 82; 335—272